US006752174B2

United States Patent
Kristofferson et al.

(10) Patent No.: US 6,752,174 B2
(45) Date of Patent: Jun. 22, 2004

(54) SAFETY PLUG

(76) Inventors: Paul Eric Kristofferson, 8052 Beachdale Dr., Orlando, FL (US) 32818; Douglas Alan Popwell, 361 Main St., Ocoee, FL (US) 34761

( * ) Notice: Subject to any disclaimer, the term of this patent is extended or adjusted under 35 U.S.C. 154(b) by 0 days.

(21) Appl. No.: 10/349,117

(22) Filed: Jan. 22, 2003

(65) Prior Publication Data

US 2004/0065376 A1 Apr. 8, 2004

Related U.S. Application Data

(60) Provisional application No. 60/415,927, filed on Oct. 3, 2002.

(51) Int. Cl.[7] ................................ F16L 55/12
(52) U.S. Cl. ................ 138/89; 90/96 T; 277/910
(58) Field of Search ............... 138/89, 90, 96 T; 184/1.5; 123/195 C, 196 R; 277/910, 205

(56) References Cited

U.S. PATENT DOCUMENTS 3,893,487 A * 7/1975 Engelking .................... 138/89
3,929,250 A * 12/1975 Abbate et al. ............... 220/237
3,933,358 A * 1/1976 Hoer ........................... 277/637
4,019,454 A * 4/1977 Landwerlen ................. 114/197
4,205,758 A * 6/1980 Johnson ....................... 220/235
4,342,336 A * 8/1982 Satterthwaite et al. ........ 138/90
4,397,914 A * 8/1983 Miura et al. .................. 428/43
4,618,154 A * 10/1986 Freudenthal ................. 277/205
4,938,314 A * 7/1990 Sitzler et al. ................. 184/1.5
5,107,808 A * 4/1992 Mahn et al. ............. 123/195 C
5,188,495 A * 2/1993 Jones, Jr. ..................... 411/369
5,378,000 A * 1/1995 Orlowski ....................... 277/25
5,386,881 A * 2/1995 Eshelman .................... 184/1.5
5,547,042 A * 8/1996 Platt ............................ 184/1.5
6,283,156 B1 * 9/2001 Motley .......................... 138/89

* cited by examiner

Primary Examiner—Patrick Brinson
(74) Attorney, Agent, or Firm—Timothy H. Van Dyke; Beusse Brownlee Wolter Mora & Maire

(57) ABSTRACT

Disclosed herein is a novel drain plug that comprises a body portion, and a recess defined in said body portion. Disposed within the recess is a sealing gasket made of an expandable material.

8 Claims, 3 Drawing Sheets

SAFETY PLUG

CROSS-REFERENCE TO RELATED APPLICATIONS

This application is related to U.S. Provisional Application No. 60/415,927, filed Oct. 3, 2002, to which priority is claimed under 35 USC §119(e).

BACKGROUND OF THE INVENTION

The automotive industry is plagued by a common problem that is estimated to cost billions of dollars worldwide: improperly installed oil drain plugs. All cars containing combustible engines require a lubricant, commonly automotive oil, in order for the engine to run properly. Most conventional engines comprise an oil pan that acts as a reservoir for the lubricant, as it is cycled through the engine. The oil pan typically comprises an oil drain hole and plug that allows lubricant to be drained out of the engine, such as to "change the oil" in the engine. When drain plugs are not installed properly, they can leak oil, or worse, fall out quickly due to the vibration of the engine. In addition, drain plugs are often overtightened, which can cause cracking and damage to the washer type gasket found under the head of conventional drain plugs. Overtightening or misalignment of the drain plug can warp the threads of the drain plug, resulting in leakage as well. If oil or other lubricants are accidentally and unknowingly drained from an engine and other major components of the engine (such as transmission, differentials, etc), they can quickly freeze-up, thereby permanently damaging the engine and components. Repair or replacement of an engine, and engine components, that have frozen up due to lack of lubricant is an extremely expensive proposition. Furthermore, the oil spillage into the environment is also a real concern, whose damage is difficult to determine in dollars.

There is a need for a simple and inexpensive product that will prevent the accidental leakage or complete draining of engine lubricant.

SUMMARY OF THE INVENTION

The subject invention pertains to a novel oil drain plug that dramatically decreases the likelihood of accidental leakage or draining of lubricant from engines caused by improper installation of oil drain plugs. According to one aspect, the subject invention relates to an oil drain plug that comprises a threaded body portion, wherein the body portion has a recess defined thereon within the threaded portion. Disposed in the recess is an expandable sealing gasket. The expandable sealing gasket can expand upon contact with petroleum based lubricants or heat, or both. The recess and gasket are positioned on the plug such that the gasket does not interfere with the fastening of the plug into the threaded recipient socket.

One of the more common scenarios that results in an improperly installed oil drain plug occurs during an oil change for the engine, such as the drive-in type lube and oil change shops. After the technician drains the oil, he or she screws the drain plug back in place. In order to complete the fastening of the drain plug, the technician requires the use of a wrench to apply the final torque to the plug. Often the technician fails to complete the fastening of the plug, due, for example, to the fact that they are distracted in the process, are not properly trained, or are simply not paying attention to their work. If the oil drain plug is not fastened tightly, it will loosen and inch its way out due to the vibration of the car and engine, ultimately resulting in critical oil loss. It is estimated that the cost of replacing engines suffering from critical oil loss is in the billions of dollars a year.

Another common scenario is directed to when a technician overtightens the drain plug. Most drain plugs possess a removable plastic or rubber washer that sits under the head of the plug. When a technician overtightens the drain plug, the washer is crushed by the pressure. As a result, the washer fails to adequately prevent lubricant leakage, and/or the drain plug becomes loose. The expandable gasket of the subject drain plug would prevent undesired lubricant loss in the event that the drain plug is overtightened. In an alternative embodiment of the subject invention, the invention pertains to a removable washer made of an expandable material. Even if a technician overtightens the drain plug, the expandable gasket will act to maintain the seal of the plug and prevent lubricant drainage.

The subject oil drain plug addresses the scenario described above. A technician typically hand tightens the subject drain plug into the recipient socket just like with a normal oil drain plug. However, if, for whatever reason the oil drain plug is not installed properly, the likelihood of the plug falling out, or experiencing critical lubricant leakage, is very unlikely. The unique expandable gasket expands upon the application of heat, contact with petroleum-based products (e.g., oil) or both. The expansion of the gasket prevents the oil drain plug from loosening and falling out, even if its has been installed improperly.

These and other advantageous aspects of the subject invention are described further below.

DESCRIPTION OF THE ILLUSTRATIVE EMBODIMENTS

Figure 1:
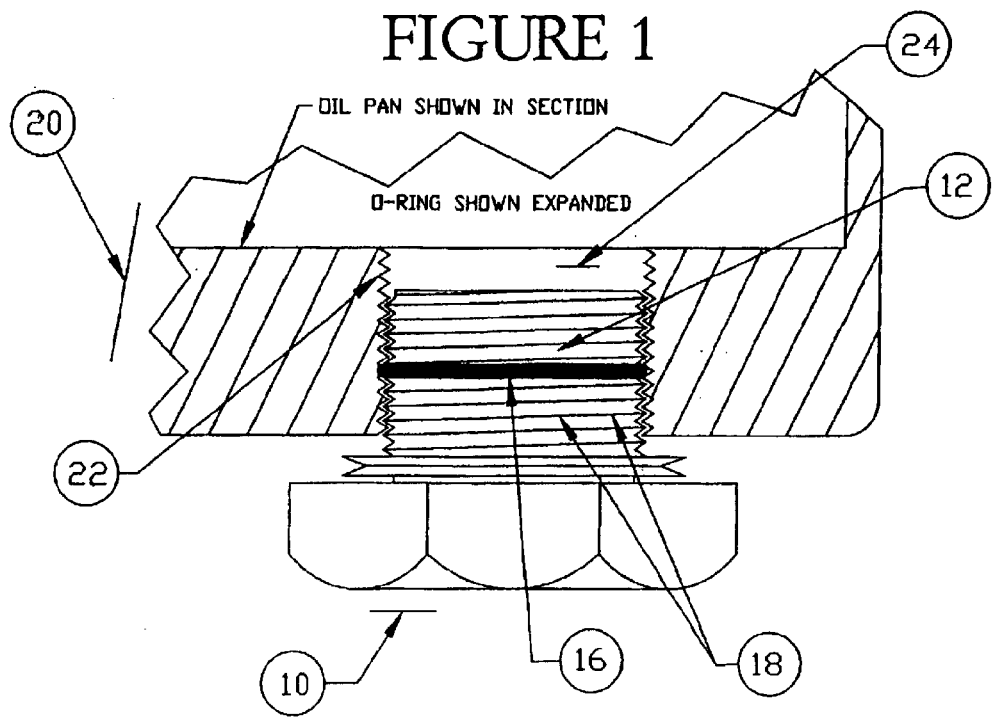
FIG. 1 shows a side view of a first embodiment wherein the recess and gasket are centrally located on the plug.

Turning to the figures, FIG. 1 shows a side view of an embodiment 10 of the subject drain plug that comprises an elongated threaded body portion 12 and head portion 14. The elongated body section comprises a recess (hidden) wherein a gasket 16 is disposed. Preferably, the gasket is an o-ring having a circular exterior surface. Alternatively, the gasket can have flat, planar surfaces defined thereon such as a "washer-like" gasket. Those skilled in the art will appreciate that the gasket can be made of various different materials. It can also take several different configurations depending on the intended use, size of the plug, etc. In a most preferred embodiment, the gasket is made of a material that expands upon being heated. Preferably still, the material irreversibly expands upon being subjected to a petroleum-based product or being subjected to a heated environment, or both. Exemplary materials include, but are not limited to, AFLAS (available through Seals Eastern, Red Bank, N.J.), NITRAL and other similar synthetic elastomers.

Figure 2:
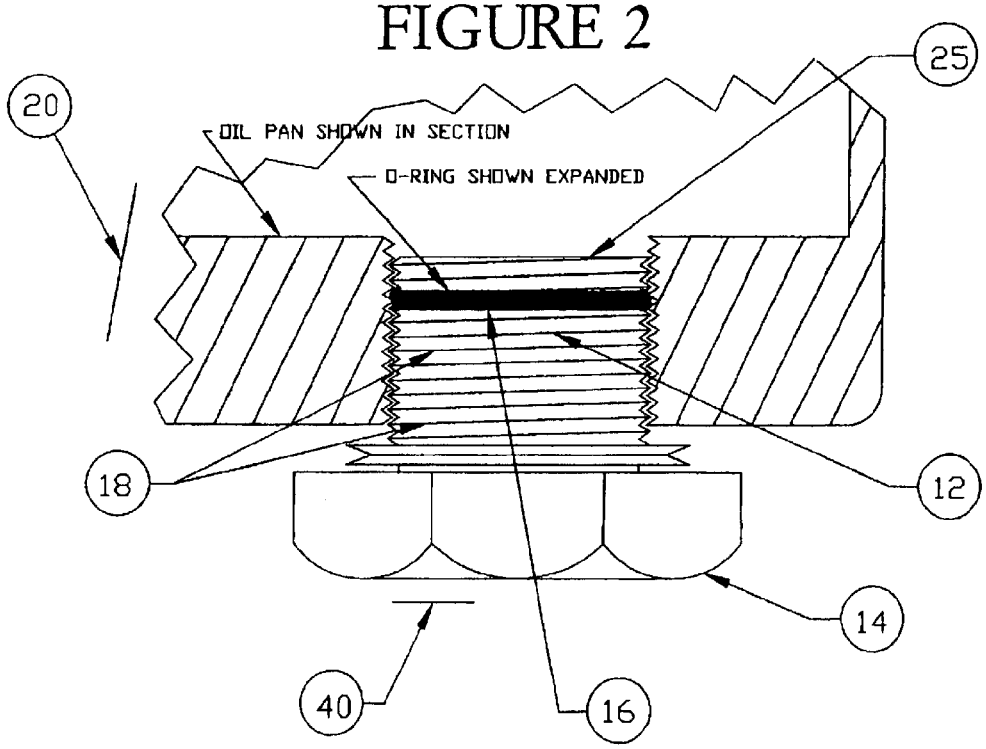
FIG. 2 shows a side view of an embodiment wherein the recess and gasket are positioned on or distal to the end of the body portion.

FIGS. 1 and 2 show the oil-pan section 20 in cross-section cutaway to show how the threads 18 of the drain plug interact with the threads 22 of the threaded socket 24. The recess (hidden) of the drain plug 10 allows the gasket 16 to sit into the body portion 12 of the drain plug 10, thereby allowing the drain plug 10 to easily screw into the threaded socket 24 without interfering with the threads 22 and 26. While a technician may notice a little more resistance of the plug 10 going into the socket 24, the plug 10 should be screwed in as easy or nearly as easy as if the gasket 16 was not disposed in said recess. For example, the gasket will not cause the plug to skip threads or become cockeyed in the socket. It is hypothesized that the less distractions for an oil technician, the less likely he will be to not fasten the drain plug properly. Complications with installing the drain plug, such as interference caused by the gasket 16, would undoubted cause distractions.

The drain plug embodiment 40 shown in FIG. 2, comprises a threaded body portion 12 and a head portion 14. Furthermore, embodiment 40 comprises a recess hidden) defined along threaded body 12 at its distal end 25, wherein a gasket 16 is disposed in said recess (hidden). The gasket 16, may be located all along the body portion. For example, the gasket 16, may be centrally located, i.e., located in the middle ⅓ portion of the body portion 12. Alternatively, the gasket 16 may be distally located, i.e., located on the ⅓ portion of the body portion 12, positioned farthest from the head portion 14. Also, while less preferred, the gasket may be located on the proximal portion of the body portion 12, i.e., the ⅓ portion closest to the head portion 14.

The subject drain plug may be made by conventional metal molding and machining methods. Preferably, the drain plug is threaded by conventional methods. After threading the body portion, the recess may then be defined in the body portion. The recess being defined after the threads allows the thread portion not to be shifted, and therefore the threads will align in the threaded socket as they normally would. Alternatively, the recess may be defined in the body portion first, followed by the threads being machined in the body portion.

Figure 3:
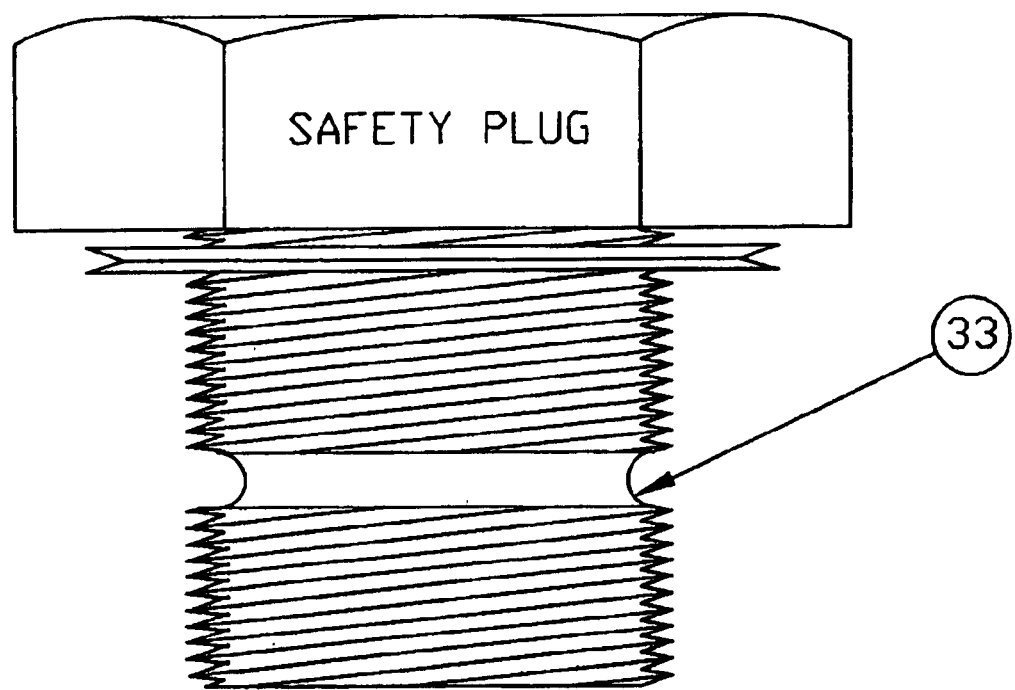
FIG. 3 shows a side view of the plug embodiment of FIG. 1, but with the expanable gaset removed. 4 shows a gasket whtat is proximally located.
Figure 4:
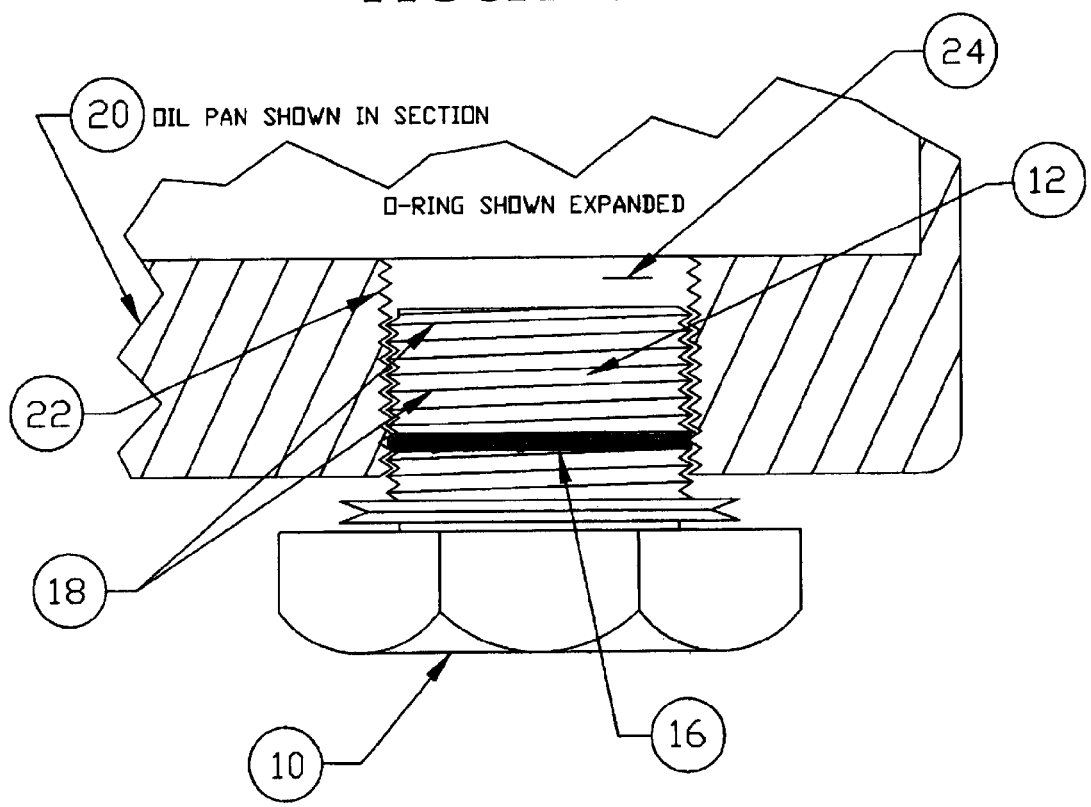
FIG. 4 shows a side view of an embodiment wherein the recess and gasket are positioned on or proximal to the end of the body portion.

FIG. 3 shows the drain plug embodiment shown in FIG. 1, except that the sealing gasket is removed. The recess 33 relates to a groove with rounded contours. This particular recess is especially adapted for holding an o-ring type sealing gasket. Naturally, the contours of the recess may be more square to better accomodate a washer-like sealing gasket having flat planar surfaces. Those skilled in the art will easily adapt the recess to accommodate the specific dimensions of the sealing gasket used.

It should be understood that the examples and embodiments described herein are for illustrative purposes only and that various modifications or changes in light thereof will be suggested to persons skilled in the art and are to be included within the spirit and purview of this application and the scope of the appended claims.

What is claimed is:

1. A plug comprising a body portion, said body portion comprising a threaded portion defined thereon configured to screw into a threaded recipient socket and a recess defined on said body portion thereon within said threaded portion a gasket, wherein said gasket is made of an expandable material; and a head;

wherein said gasket is disposed within said recess;

wherein said gasket and recess are configured such that said plug can be screwed into said threaded recipient socket without interference from said gasket.

2. The plug of claim 1 wherein said recess is centrally positioned on said body portion.

3. The plug of claim 1, wherein said recess is distally positioned on said body portion in relation to the head.

4. The plug of claim 1, wherein said recess is proximally positioned on said body portion in relation to the head.

5. The plug of claim 1, wherein said gasket is made of AFLAS, NITRAL or similar synthetic elastomers.

6. A method of securing a drain plug in a recipient socket comprising providing a drain plug having a body portion, said body portion comprising a threaded portion defined thereon configured to screw into a threaded recipient socket and a recess defined on said body portion thereon within said threaded portion; a gasket, wherein said gasket is made of a an expandable material; and a head; wherein said gasket is disposed within said recess; and fastening said drain plug in said recipient socket.

7. The method of claim 6, wherein said recipient socket is a threaded aperture in an engine oil pan.

8. A plug comprising a solid body portion, said solid body portion comprising a recess defined thereon; a gasket, wherein said gasket is made of an expandable material; and a head; wherein said gasket is disposed within said recess and is centrally or distally positioned on said body portion in relation to the head.

* * * * *